United States Patent
Yanai et al.

(10) Patent No.: US 7,596,947 B2
(45) Date of Patent: *Oct. 6, 2009

(54) GAS TURBINE PLANT

(75) Inventors: Noboru Yanai, Hyogo-ken (JP);
Yoshiaki Tsukuda, Hyogo-ken (JP);
Hideaki Sugishita, Hyogo-ken (JP);
Satoru Kamohara, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 55 days.

This patent is subject to a terminal disclaimer.

(21) Appl. No.: 10/590,014

(22) PCT Filed: Dec. 22, 2004

(86) PCT No.: PCT/JP2004/019169
§ 371 (c)(1),
(2), (4) Date: Aug. 21, 2006

(87) PCT Pub. No.: WO2005/080772
PCT Pub. Date: Sep. 1, 2005

(65) Prior Publication Data
US 2007/0137203 A1 Jun. 21, 2007

(30) Foreign Application Priority Data
Feb. 23, 2004 (JP) ............................. 2004-046223

(51) Int. Cl.
G21D 5/00 (2006.01)
(52) U.S. Cl. ...................................... 60/644.1; 60/682
(58) Field of Classification Search ............... 60/644.1, 60/682–684
See application file for complete search history.

(56) References Cited

U.S. PATENT DOCUMENTS 3,140,588 A * 7/1964 Brown ..................... 376/207
3,583,156 A * 6/1971 Schabert ................... 376/391

(Continued)

FOREIGN PATENT DOCUMENTS

GB          1362902          1/1972

(Continued)

OTHER PUBLICATIONS

European Search Report dated Feb. 20, 2008, issued in corresponding European Patent Application No. 04807526.

(Continued)

Primary Examiner—Hoang M Nguyen
(74) Attorney, Agent, or Firm—Westerman, Hattori, Daniels & Adrian, LLP.

(57) ABSTRACT

A gas turbine plant, wherein a plurality of first gas turbines positioned coaxially with compressors and a second gas turbine positioned coaxially with a generator are rotated by a coolant heated by heat energy provided by the fission of a coated particle fuel. A flow in a bypass passage is controlled by controlling the opening of bypass valves of (n−1) in quantity which bypass the first gas turbines on up to (n−1) shafts in starting. Accordingly, the rotational speeds of the first gas turbines on up to (n) shafts are increased to a rated rotational speed in order starting at the initial stage on the upstream side of a high temperature gas-cooled reactor toward the lower stage for each shaft.

4 Claims, 7 Drawing Sheets

U.S. PATENT DOCUMENTS

| | | | |
|---|---|---|---|
| 4,015,430 A * | 4/1977 | Braytenbah et al. | 376/211 |
| 4,052,260 A | 10/1977 | Forster et al. | |
| 4,651,530 A * | 3/1987 | Omori | 60/667 |
| 5,118,395 A | 6/1992 | Chen et al. | |
| 5,309,492 A | 5/1994 | Adams | |
| 6,112,523 A | 9/2000 | Kamo et al. | |
| 2004/0042579 A1 | 3/2004 | Bolton et al. | |
| 2007/0183554 A1 * | 8/2007 | Yanai et al. | 376/211 |

FOREIGN PATENT DOCUMENTS

| | | |
|---|---|---|
| JP | 52-50404 | 4/1977 |
| JP | 5-134090 A | 5/1993 |
| JP | 8-338892 A | 12/1996 |
| JP | 9-144557 A | 6/1997 |
| JP | 9-303114 A | 11/1997 |
| JP | 10-141006 A | 5/1998 |
| JP | 10-317915 A | 12/1998 |
| JP | 10-322215 A | 12/1998 |
| JP | 11-315725 A | 11/1999 |
| JP | 2000-80926 A | 3/2000 |
| JP | 2001-329849 A | 11/2001 |
| JP | 2003-166428 A | 6/2003 |
| SU | 165035 | 9/1964 |
| SU | 853125 | 8/1981 |
| WO | WO 02/078010 A1 | 10/2002 |
| WO | WO 02/080190 A1 | 10/2002 |
| WO | WO 02/095768 A1 | 11/2002 |

OTHER PUBLICATIONS

International Search Report mailed Mar. 29, 2005 of International Application PCT/JP2004/019169.

McLain, Stuart et al., "Reactor Handbook Second Edition," Engineering, 1964, pp. 686-694, vol. IV, Interscience Publishers.

* cited by examiner

GAS TURBINE PLANT

TECHNICAL FIELD

The present invention relates to a gas turbine plant which utilizes heat being generated by a high-temperature gas-cooled reactor, and especially, relates to a gas turbine plant which is provided with a gas turbine being driven by gas heated by the heat of a high-temperature gas-cooled reactor and supplying exhaust gas to the high-temperature gas-cooled reactor.

BACKGROUND ART

A high-temperature gas-cooled reactor which is one type of a nuclear reactor employs, as fuels, coated-particle fuels that are nuclear fuels being clad with heat-resistant pyrolytic carbons (PyC) and silicon carbides (SiC) and also employs heat-resistant graphite for the retarder and the in-core structural materials, wherein helium gas is used for the coolant thereof. In addition, block type of fuels being graphite blocks with fuel rods inserted therein and pebble bed fuels being spherically compact are employed as coated-particle fuels to be used for a high-temperature gas-cooled reactor. Then, by having the reactor core composed of ceramics instead of metal materials, the reactor core can withstand very high temperature nearly as high as 1000° C.

In consequence, by utilizing the heat generated by a high-temperature gas-cooled reactor, high outlet gas temperature of over 800° C. that cannot be achieved by other types of nuclear reactor can be attained, thereby achieving electrical power generation of high thermal efficiency. In addition, the fuels to be used are superior in safety because fuel melting and breakage of a coating layer scarcely occur when the fuel temperature increases, and fission products are maintained even in accident conditions. Moreover, in Japan, a "High Temperature Engineering Test Reactor" (HTTR) is operated as a high-temperature gas-cooled reactor.

In an electrical power generation plant, such a high-temperature gas-cooled reactor as described hereinabove is employed for the steam cycle electric power generation in which steam is generated by high temperature gas from a high-temperature gas-cooled reactor, so as to drive a steam turbine, and is employed for the closed cycle gas turbine electric power generation in which a gas turbine is driven by high temperature gas from a high-temperature gas-cooled reactor. Here, in a steam turbine electrical power generation having steam conditions being equivalent to those of conventional thermal electrical power generation, approximately 40% thermal efficiency is achieved, but by employing the closed cycle gas turbine electrical power generation having the nuclear reactor coolant outlet temperature of approximately higher than 850° C., there is a possibility of achieving the thermal efficiency ranging from 45% to 50%.

Then, as a high-temperature gas-cooled reactor utilized in the closed cycle gas turbine electrical power generation having high thermal efficiency, is disclosed a high-temperature gas-cooled reactor in a gas turbine plant in which a system circulating in the high-temperature gas-cooled reactor is different from a system circulating in the gas turbine. (See the Patent Literature 1.) In the gas turbine plant being disclosed in the Patent Literature 1, helium gas in the secondary circuit is heated by high temperature helium gas being obtained by the high-temperature gas-cooled reactor provided to the primary circuit, and then, a gas turbine is driven by the heated helium gas in the secondary circuit.

Additionally, the present applicant disclosed a gas turbine plant in which a gas turbine sharing a same shaft with a high pressure compressor and a gas turbine sharing a same shaft with a generator are provided in such a manner as to be connected by different shafts and the gas turbines being connected by the different shafts are driven by helium gas from a high-temperature gas-cooled reactor. (See the Patent Literature 2.) In this gas turbine plant, helium gas discharged from the gas turbines is supplied to the high-temperature gas-cooled reactor after being compressed by a compressor. A "Pebble Bed Modular Reactor" (PBMR) has been developed, which is employed for such a gas turbine plant as described hereinabove and is provided with a pebble bed reactor core using pebble bed fuels.

Moreover, the gas turbine plant in the Patent Literature 2 is a gas turbine plant that is provided with two-shaft gas turbines, wherein a gas turbine connected to a generator by a same shaft is also connected to a low pressure compressor by the same shaft. As a result, is increased a load which is to be applied to a gas turbine being connected to a low pressure compressor and a generator by one shaft. Therefore, a gas turbine plant using the "PBMR" has been developed, wherein, in order to distribute the load, a gas turbine being connected to a low pressure compressor by one shaft is provided and a gas turbine plant including three-shaft gas turbines is adopted.

Patent Literature 1: Patent Application Laid Open as H08-338892.

Patent Literature 2: Patent Application Laid Open as H9-144557.

DISCLOSURE OF THE INVENTION

Problems to be Solved by the Invention

In such a gas turbine plant as described hereinabove, at the time of start-up, in order to avoid the rotating speed which causes the rotating blades composing a gas turbine to resonate, it is necessary to increase the rotating speed of each gas turbine at a dash up to the rotating speed in a safe region. At this time, in a gas turbine plant in the Patent Literature 2, by having a generator operated as a thyristor, the rotating speed of a gas turbine sharing a same shaft with a generator is increased, and at the same time, by supplying helium gas from a high temperature gas-cooled reactor, the rotating speed of a gas turbine sharing a same shaft with a compressor is increased.

However, when gas turbines being revved up by the helium gas from a high-temperature gas-cooled reactor are connected to a plurality of shafts, conventionally, each of the gas turbines was not controlled independently. Therefore, at the time of start-up when the gas turbines being connected to a plurality of shafts are revved up to the rotating speed in the safe region, there is a concern that any of the gas turbines might not attain the rotating speed in the safe region, resulting in generation of resonance of the rotating blades, which may cause the blades to be damaged.

It is an object of the present invention to provide a gas turbine plant which is provided with gas turbines being connected to a plurality of shafts and can control each gas turbine safely during start-up.

Means for Solving the Problem

In order to achieve the object, a gas turbine plant in accordance with the present invention comprises a high-temperature gas-cooled reactor which warms the coolant by thermal energy obtained by nuclear fission of clad fission products in coated-particle fuels; "n"-shaft first gas turbines that are rotated by the coolant being warmed by the high-temperature gas-cooled reactor and share the same shafts with compressors compressing the coolant; a second gas turbine that is rotated by the coolant being discharged from the first gas turbine in the last stage after rotating each of the first gas turbines, respectively, and shares a same shaft with a generator performing electrical power generation; and "n−1" pieces of bypass valves that have each of the "n−1"-shaft first gas turbines bypassed to the coolant, respectively, excluding the first gas turbine in the first stage being close to the high-temperature cooled-gas reactor, among the "n"-shaft first gas turbines; wherein, during start-up, by controlling the lift of the "n−1" pieces of bypass valves, each of the "n"-shaft first gas turbines has the rotating speed thereof increased up to the rated rotating speed shaft by shaft sequentially, starting from the first gas turbine in the first stage.

In addition, the gas turbine plant in accordance with the present invention comprises a high-temperature gas-cooled reactor which warms the coolant by thermal energy obtained by nuclear fission of clad fission products in coated-particle fuels; a high pressure gas turbine which is rotated by the coolant being warmed by the high-temperature gas-cooled reactor and shares a same shaft with a high pressure compressor compressing the coolant; a low pressure gas turbine which is rotated by the coolant being discharged from the high pressure gas turbine and shares a same shaft with a low pressure compressor compressing the coolant; a gas turbine for electrical power generation which is rotated by the coolant being discharged from the low pressure gas turbine and shares a same shaft with a generator performing electrical power generation; and a bypass valve which has the low pressure turbine bypassed to the coolant; wherein, during start-up, first, the rotating speed of the high pressure compressor is increased up to the rated rotating speed by adjusting the lift of the bypass valve after charging the coolant with the bypass valve fully closed, and then next, by fully closing the bypass valve, the rotating speed of the low pressure compressor is increased up to the rated rotating speed.

Advantages of the Invention

In accordance with the present invention, when the rotating speed of a gas turbine plant including a plurality of shafts is increased to the rated rotating speed during start-up, by providing bypass valves and controlling the lift of the bypass valves, each of the gas turbines sharing same shafts with the compressors is controlled independently, thereby making it possible to rev up. Therefore, compared to a case where all the gas turbines are revved up at a time, it is possible to confirm whether each gas turbine is revved up to the rated rotating speed or not, so that the gas turbines can be started up safely.

LIST OF REFERENCE SYMBOLS

1. High-Temperature Gas-Cooled Reactor
2. High Pressure Turbine (HPT)
3. Low Pressure Turbine (LPT)
4. Power Gas Turbine (PT)
5. Generator
6. Heat Exchanger
7. Precooler
8. Low Pressure Compressor (LPC)
9. Intercooler
10. High Pressure Compressor (HPC)
11. and 12. Bypass Valves

BEST MODE FOR CARRYING OUT THE INVENTION

FIRST EMBODIMENT

Figure 1:
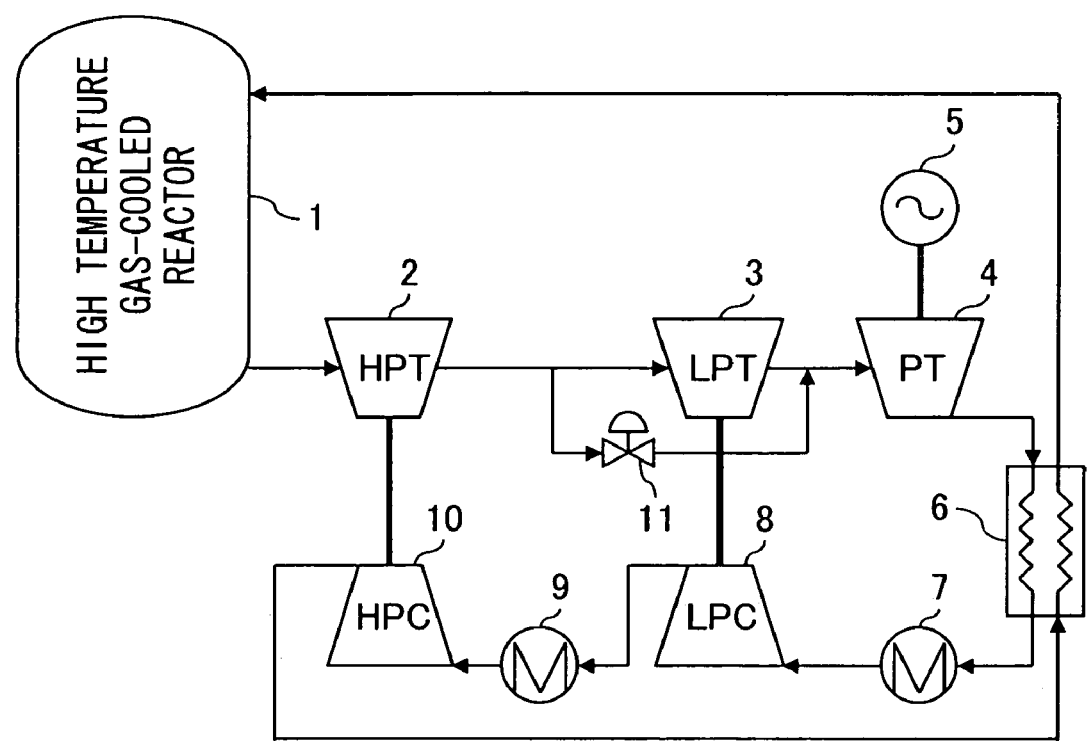
FIG. 1 is a block diagram showing a construction of a gas turbine plant in accordance with a first embodiment of the prevent invention.

Referring now to the drawings, a first embodiment of the present invention will be described hereinafter. FIG. 1 is a block diagram showing the construction of a gas turbine plant in accordance with the present embodiment.

A gas turbine plant in FIG. 1 comprises a high-temperature gas-cooled reactor 1 which provides helium gas with thermal energy generated by nuclear fission of fission products and discharges high temperature helium gas; a high pressure gas turbine (HPT) 2 which is driven by the helium gas being discharged from the high-temperature gas-cooled reactor 1; a low pressure turbine (LPT) 3 which is driven by the helium gas being discharged from the HPT 2; a power gas turbine (PT) 4 which is driven by the helium gas being discharged from the LPT 3; a generator which is so constructed as to be connected to the PT 4 by a same shaft and is rotated by the PT 4; a heat exchanger 6 which performs heat exchange by being supplied with the helium gas discharged from the PT 4; a precooler 7 which cools the helium gas from which heat is released by the heat exchanger 6; a low pressure compressor (LPC) 8 which compresses the helium gas being cooled by the precooler 7; an intercooler 9 which cools the helium gas being compressed and pressurized by the LPC 8; a high pressure compressor (HPC) 10 which compresses the helium gas being cooled by the intercooler 9 so as to supply to the heat exchanger 6; and a bypass valve 11 which has the helium gas being discharged from the HPT 2 bypass the LPT 3 so as to supply to the PT 4.

When the gas turbine plant being constructed as mentioned hereinabove is operated at the rated load, fuel elements being coated-particle fuels having minute ceramics fuel particles of fission products multiply-clad with prolytic carbons and silicon carbides are supplied to the high-temperature gas-cooled reactor 1 that is provided with a heat-resistant structure by employing heat-resistant graphite for the retarder and the in-core structural materials, and then, the fission products in the fuel elements perform nuclear fission. The thermal energy being generated by the nuclear fission of fission products is supplied to the helium gas being provided from the heat exchanger 6, and high temperature and high pressure helium gas is supplied to the HPT 2. In addition, pebble bed fuels or block fuels are employed as fuel elements consisting of coated-particle fuels.

Then, the HPT 2 is rotated by the high temperature and high pressure helium gas from the high-temperature gas-cooled reactor 1, so as to rotate the HPC 10, and the helium gas being discharged from the HPT 2 is supplied to the LPT 3. At this time, with the bypass valve 11 fully closed, all the helium gas being discharged from the HPT 2 is supplied to the LPT 3. In consequence, in a similar manner, the LPT 3 is rotated by the helium gas rotating the HPT 2, so as to rotate the LPC 8, and at the same time, the helium gas being discharged from the LPT 3 is supplied to the PT 4. Furthermore, the PT 4 is rotated by the helium gas rotating the LPT 3, so as to rotate the generator 5, thereby generating the electrical power. In a manner as described hereinabove, the helium gas completing the work thereof by rotating the HPT 2, the LPT 3 and the PT 4, respectively, is supplied to the heat exchanger 6.

In the heat exchanger 6, high temperature helium gas being discharged from the PT 4 is supplied, and also, by having the helium gas being compressed in the HPC 10 perform heat exchange with the helium gas from the PT 4, the warmed helium gas from the HPC 10 is supplied to the high temperature gas-cooled reactor 1, and at the same time, the cooled helium gas from the PT 4 is supplied to the precooler 7. The helium gas being cooled by the precooler 7 is compressed and pressurized by being supplied to the LPC 8 which is rotated by the LPT 3. At this time, the density of the helium gas is increased by having the helium gas cooled by the precooler 7, thereby enhancing the compression efficiency in the LPC 8.

Then, the pressurized helium gas is compressed and pressurized by the HPC 10 that is rotated by the HPT 2 after being re-cooled by the intercooler 9. At this time, in the same manner as being cooled by the precooler 7, by having the helium gas cooled by the intercooler 9, the compression efficiency in the HPC 10 is enhanced by increasing the density of the helium gas. The helium gas being pressurized by the HPC 10 is warmed by the heat exchanger 6 and supplied to the high-temperature gas-cooled reactor 1.

By referring to FIG. 2A through FIG. 2C, will be described hereinafter behaviors during start-up of a gas turbine plant, in which each portion thereof behaves as described hereinabove during the rated operation. First, with the bypass valves 11 fully closed, the helium gas in a storage tank (not being illustrated) is charged into the main system of the helium gas consisting of the high-temperature gas-cooled reactor 1, the HPT 2, the LPT 3, the PT 4, the heat exchanger 6, the LPC 8 and the HPC 9 in the gas turbine plant of FIG. 1. At this time, by starting up the blower system for initial setting (not being illustrated) at the same time, the helium gas being charged into the main system is circulated, and the flow volume is controlled so as to prevent the helium gas from flowing to the LPC 8 and the HPC 10.

Then, when it is confirmed that the temperature and the pressure of the helium gas being charged into the main system reach predetermined values, the operation is shifted to the critical operation in the high-temperature gas-cooled reactor 1. Then, when the interior of the high-temperature gas-cooled reactor 1 reaches criticality, the outlet temperature of the high-temperature gas-cooled reactor 1 is controlled to fall within a predetermined temperature range. Subsequently, by controlling the flow volume of the helium gas flowing through the HPT 2, the LPT 3 and the PT 4 and by operating the generator 5 as a thyristor, the rotating speed of the PT 4 is increased up to the rated rotating speed "Rb." Then, when the rotating speed of the PT 4 is confirmed to have increased to the rated rotating speed "Rb," the generator 5 is synchronized.

Figure 2A:
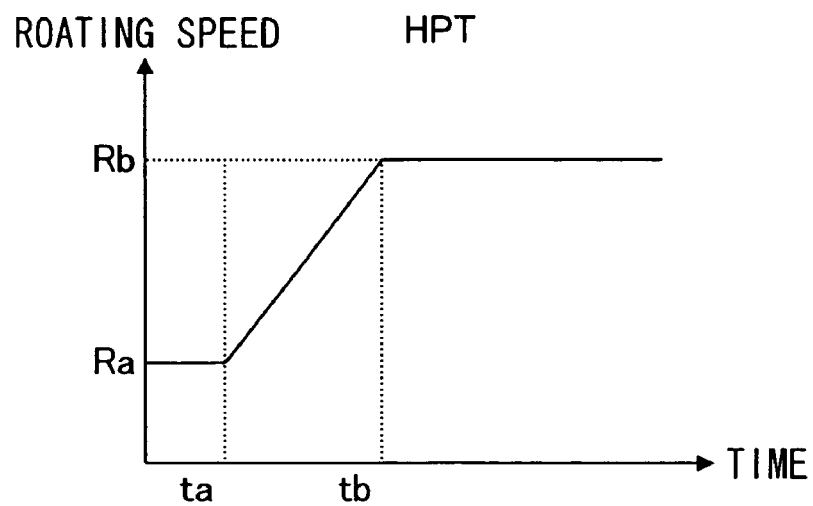
FIG. 2A is a timing chart showing the transition of the rotating speed of a high pressure turbine during start-up of a gas turbine plant of FIG. 1.
Figure 2B:
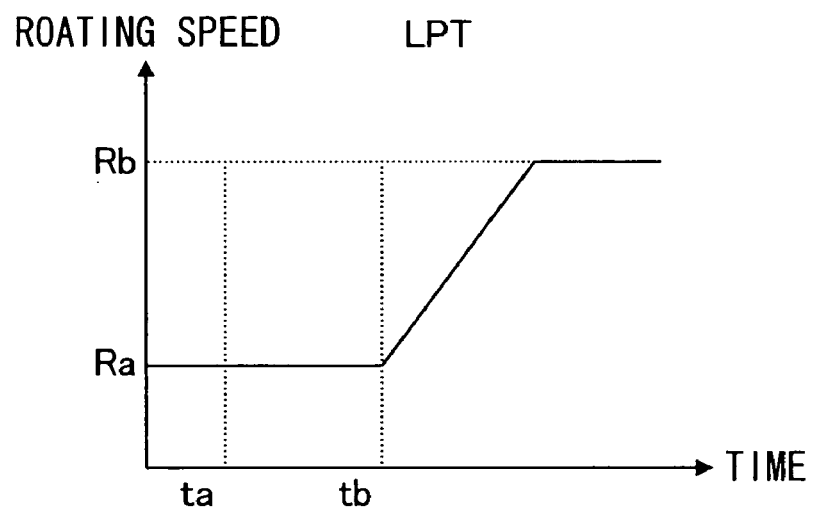
FIG. 2B is a timing chart showing the transition of the rotating speed of a low pressure turbine during start-up of a gas turbine plant of FIG. 1.

As described hereinabove, when the generator 5 is synchronized after time "ta" has passed since initiation of start-up, as shown in FIG. 2A and FIG. 2B, the rotating speeds of the HPT 2 and the LPT 3 are confirmed to have reached the rotating speed "Ra." Then, the plant load is increased by controlling the flow volume of the helium gas flowing through the LPC 8 and the HPC 10. At this time, as shown in FIG. 2C, by opening the bypass valve 11 to achieve the lift as much as "x" %, a part of the helium gas from the HPT 2 is supplied to the PT 4 by way of the bypass valve 11. Then, the load is increased, and at the same time, as shown in FIG. 2A, the rotating speed of the HPT 2 is increased up to the rated rotating speed "Rb." In addition, by opening the bypass valve 11 until the lift thereof reaches "x" %, as shown in FIG. 2B, the rotating speed of the LPT 3 can be maintained at the rotating speed "Ra."

Figure 2C:
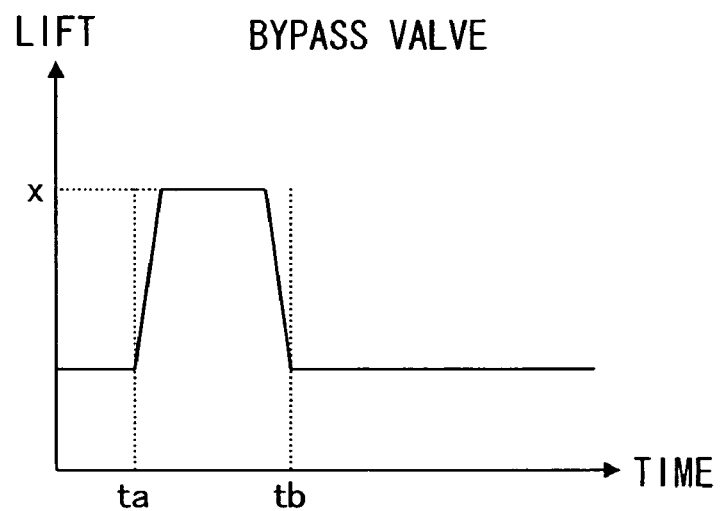
FIG. 2C is a timing chart showing the transition of the lift of a bypass valve during start-up of a gas turbine plant of FIG. 1.

Then, when it is confirmed that the rotating speed of the HPT 2 reaches the rated rotating speed "Rb" after time "tb" passes, as shown in FIG. 2C, the bypass valve 11 is fully closed and all the helium gas from the HPT 2 is supplied to the LPT 3. In consequence, the flow volume of the helium gas flowing to the LPT 3 is increased, so that as shown in FIG. 2B, the rotating speed of the LPT 3 is increased up to the rated rotating speed "Rb." When the rotating speeds of the HPT 2, the LPT 3 and the PT 4 are increased to the rated rotating speeds "Rb," the plant load is further increased, so as to shift from no-load operation to the rated load operation. In addition, when the plant load is increased as described hereinabove, the outlet temperature of the high-temperature gas-cooled reactor 1 is controlled to attain a predetermined temperature.

As described hereinabove, in the present embodiment, by installing a bypass valve 11, the rotating speeds of the HPT 2 and the LPT 3 can be controlled independently during plant start-up. In consequence, by increasing the rotating speeds of the HPT 2 and the LPT 3 up to the rated rotating speed, respectively, the HPT 2 and the LPT 3 can be operated in a safe region.

SECOND EMBODIMENT

Figure 3:
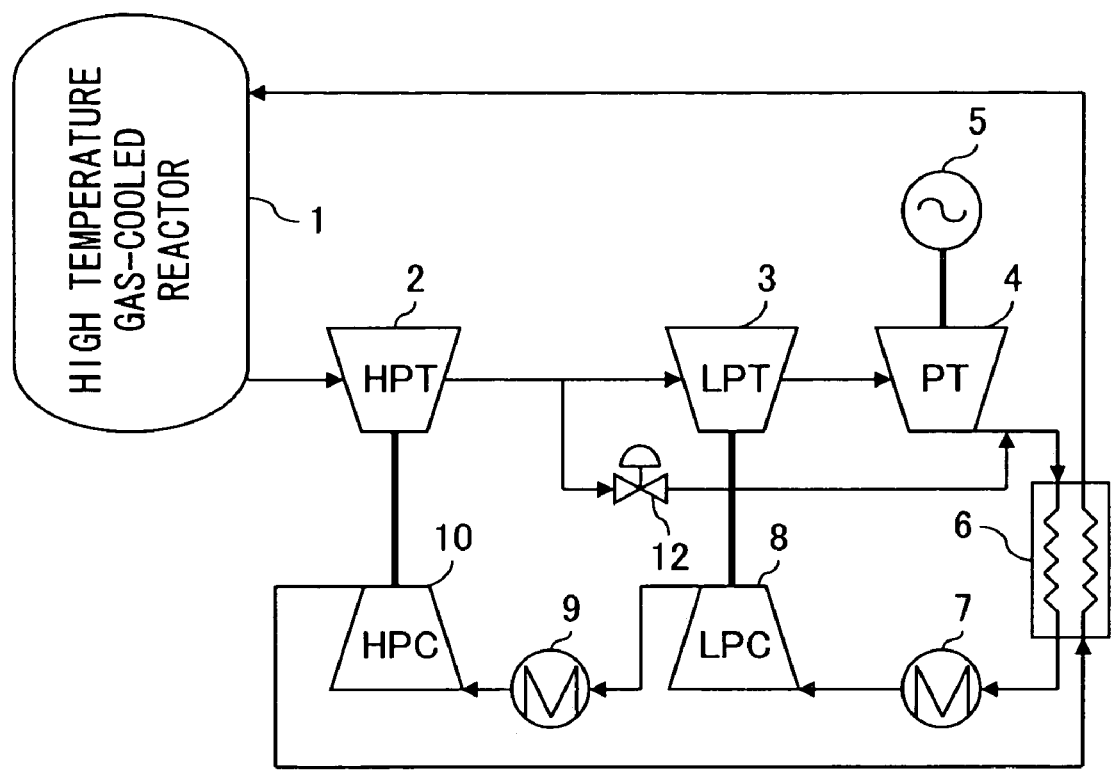
FIG. 3 is a block diagram showing a construction of a gas turbine plant in accordance with a second embodiment of the present invention.

A second embodiment of the present invention will be described by referring to the drawings. FIG. 3 is a block diagram showing the construction of a gas turbine plant in accordance with the present embodiment. Additionally, the portions of the gas turbine plant in FIG. 3 that are used for the same purpose as the gas turbine plant in FIG. 1 will be provided with the same symbols, and a detailed description thereof will be omitted.

Being different from the gas turbine plant in FIG. 1, the gas turbine plant in FIG. 3 is provided with a bypass valve 12, instead of a bypass valve 11, which has the helium gas being discharged from the HPT 2 bypass the LPT 3 and the PT 4 to supply to the heat exchanger 6. When the gas turbine plant being constructed in this manner is operated at the rated load, the electrical power is generated by the generator 5 by fully closing the bypass valve 12 and having each portion in the gas turbine plant carry out the same behaviors as the first embodiment.

When such a gas turbine plant as described hereinabove is started up, in the same manner as the first embodiment, the helium gas in a storage tank is charged and circulated, with the bypass valve 12 fully closed. Then, when it is confirmed that the helium gas being charged into the main system has attained a predetermined temperature and a predetermined pressure, the outlet temperature of the high-temperature gas-cooled reactor 1 is controlled to achieve the predetermined temperature.

After that, by having the generator 5 behave as a thyristor, the rotating speed of the PT 4 is increased up to the rated rotating speed "Rb," and then, the generator 5 is synchronized. Subsequently, the plant load is increased, and first, at the same time, the rotating speed of the HPT 2 is increased up to the rated rotating speed "Rb" by opening the bypass valve 12 until the lift thereof reaches "x" %, and next, with the bypass valve fully closed, the rotating speed of the LPT 3 is increased up to the rated rotating speed "Rb." Then, by increasing the plant load further, no-load operation is shifted to the rated load operation.

As described hereinabove, in the present embodiment, by providing a bypass valve 12, the rotating speeds of the HPT 2 and the LPT 3 can be controlled independently during plant start-up. In consequence, by increasing the rotating speeds of the HPT 2 and the LPT 3 up to the rated rotating speed, respectively, the HPT 2 and the LPT 3 can be operated in the safe region.

Additionally, the gas turbine plants in accordance with the first and the second embodiments comprise three-shaft gas turbines, but may comprise "n"-shaft turbines having more than three shafts. Here, as shown in FIG. 4 through FIG. 7, because the gas turbine (PT) 4 sharing the same shaft with a generator is a single shaft gas turbine, the gas turbines "T1" through "Tn–1" sharing the same shafts with the compressors "C1" through "Cn–1," respectively, have "n–1" shafts, and at the same time, "n–2" pieces of bypass valves "V1" through "Vn–2" are installed in order to bypass each of the gas turbines "T2" through "Tn–2" sharing the same shafts with the compressors "C2" through "Cn–1," excluding the first-stage gas turbine "T1."

Figure 4:
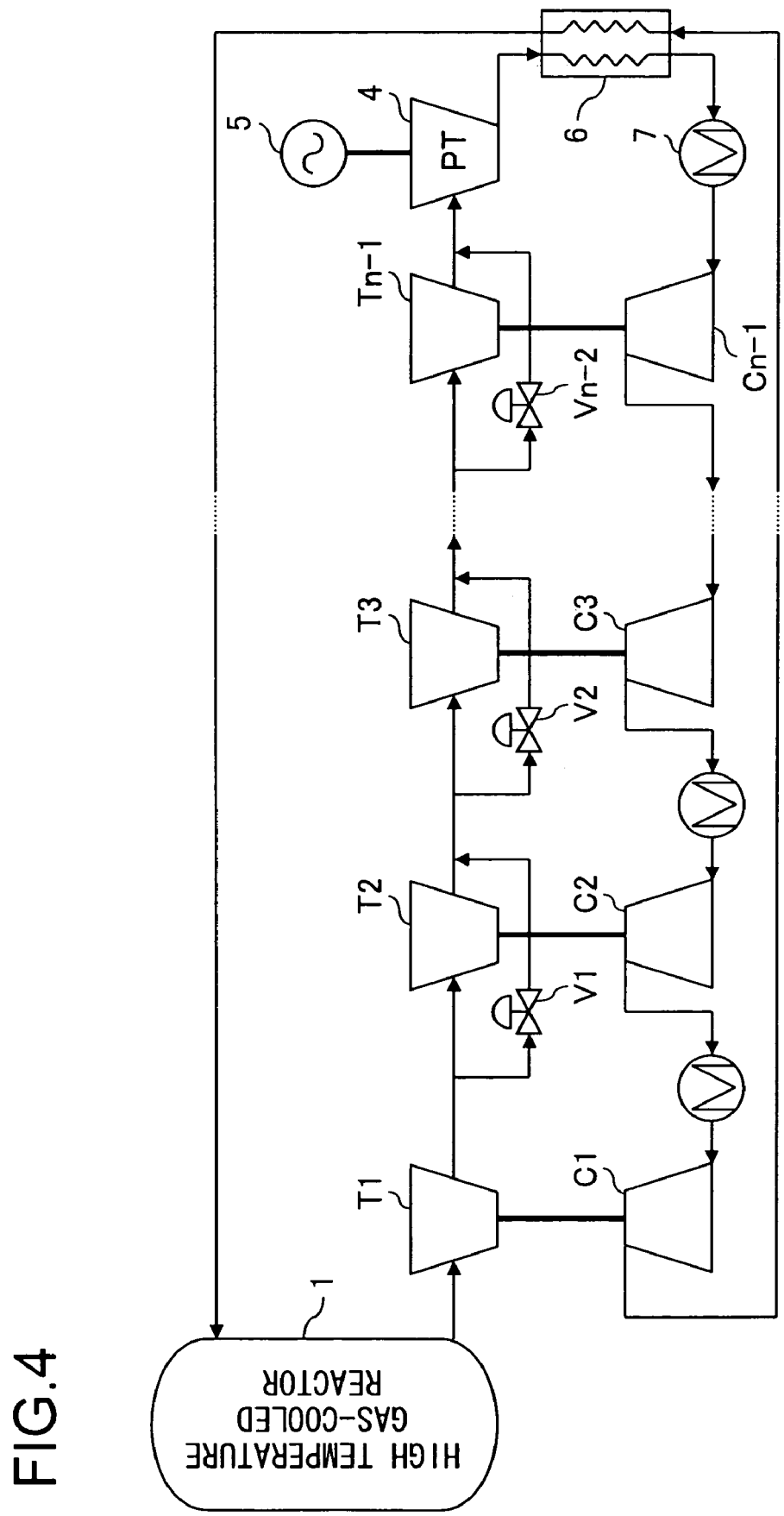
FIG. 4 is a block diagram showing another construction of a gas turbine plant in accordance with a first embodiment of the present invention.
Figure 5:
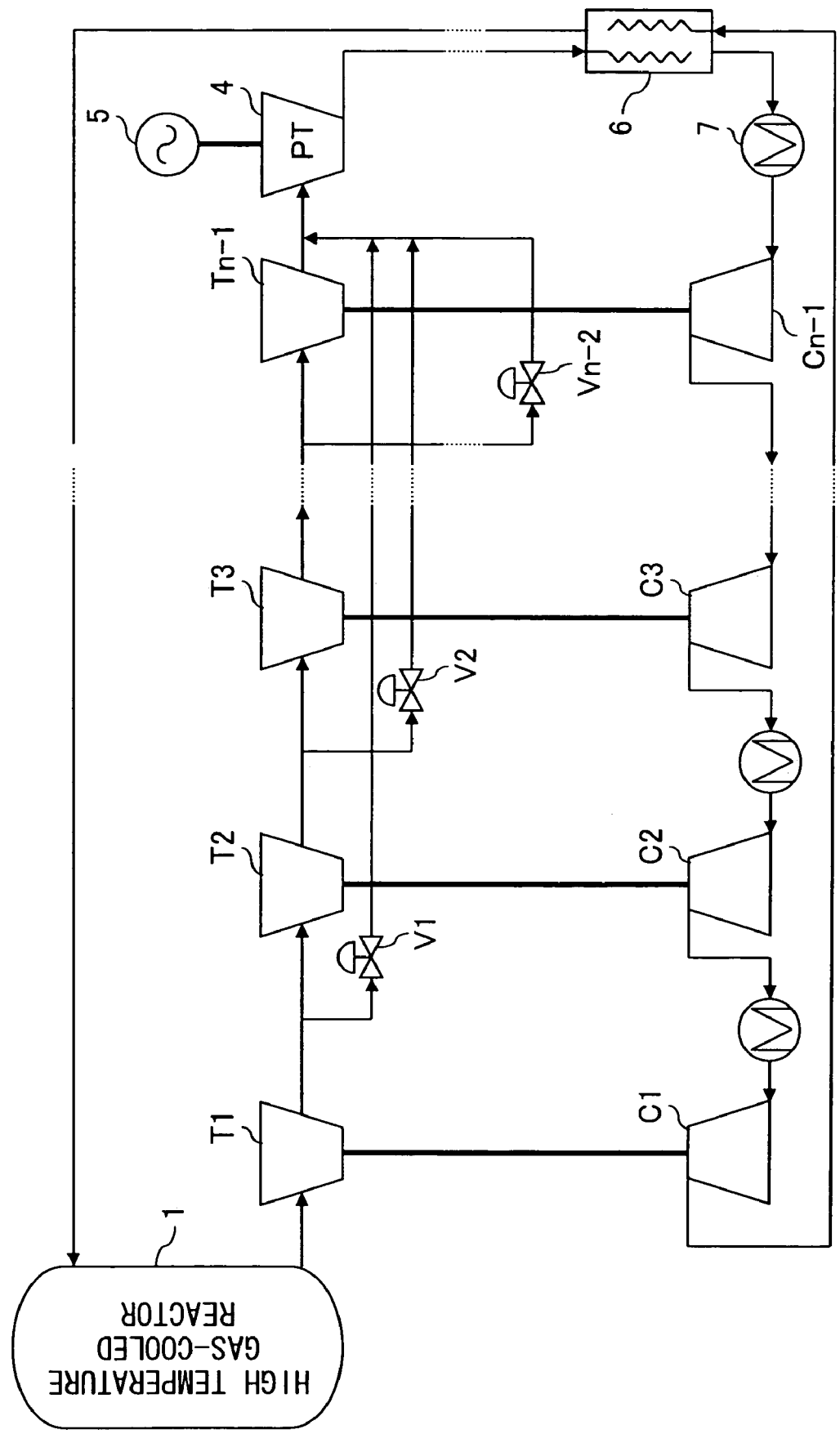
FIG. 5 is a block diagram showing another construction of a gas turbine plant in accordance with a first embodiment of the present invention.
Figure 6:
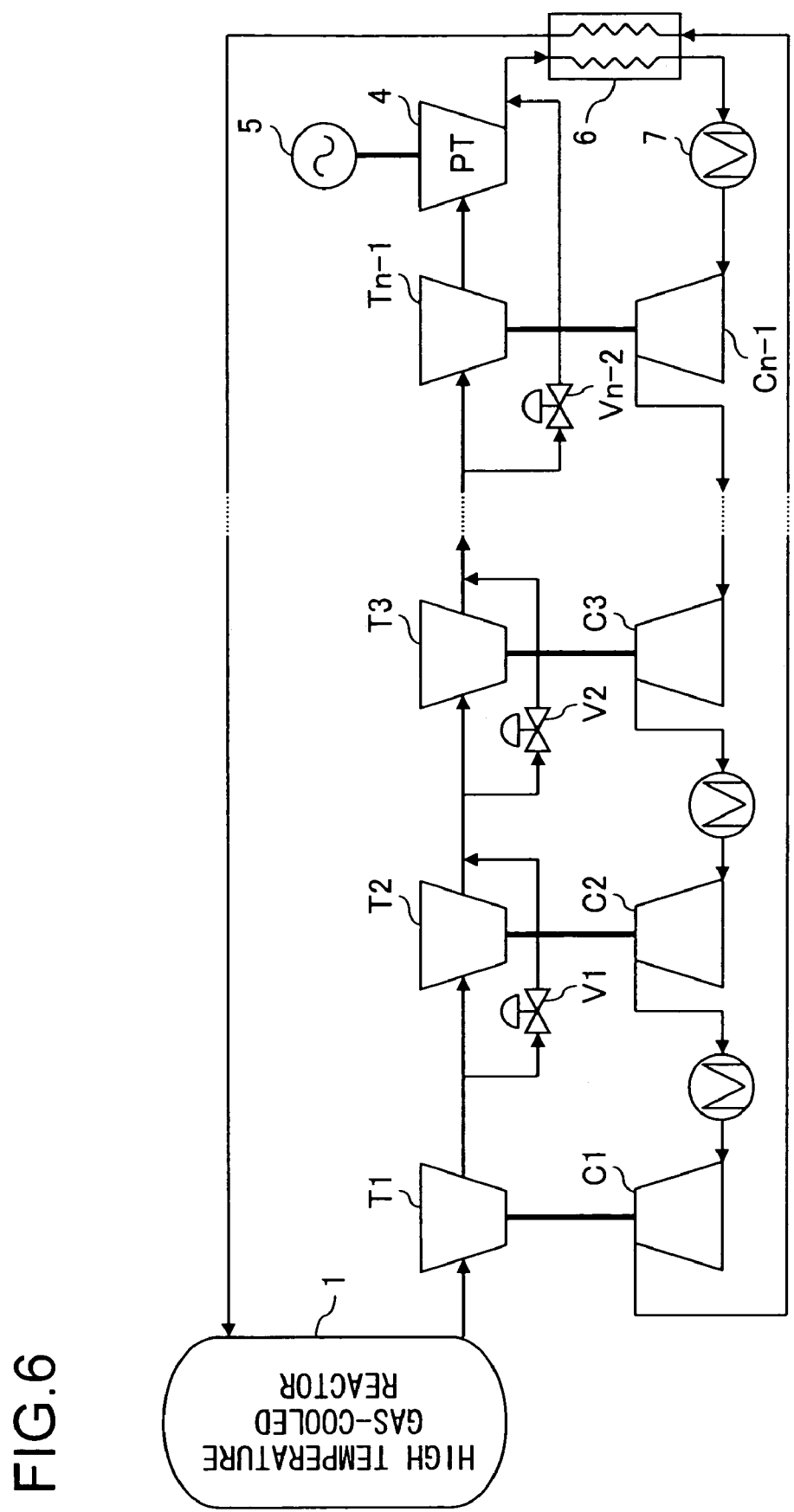
FIG. 6 is a block diagram showing another construction of a gas turbine plant in accordance with a second embodiment of the present invention.
Figure 7:
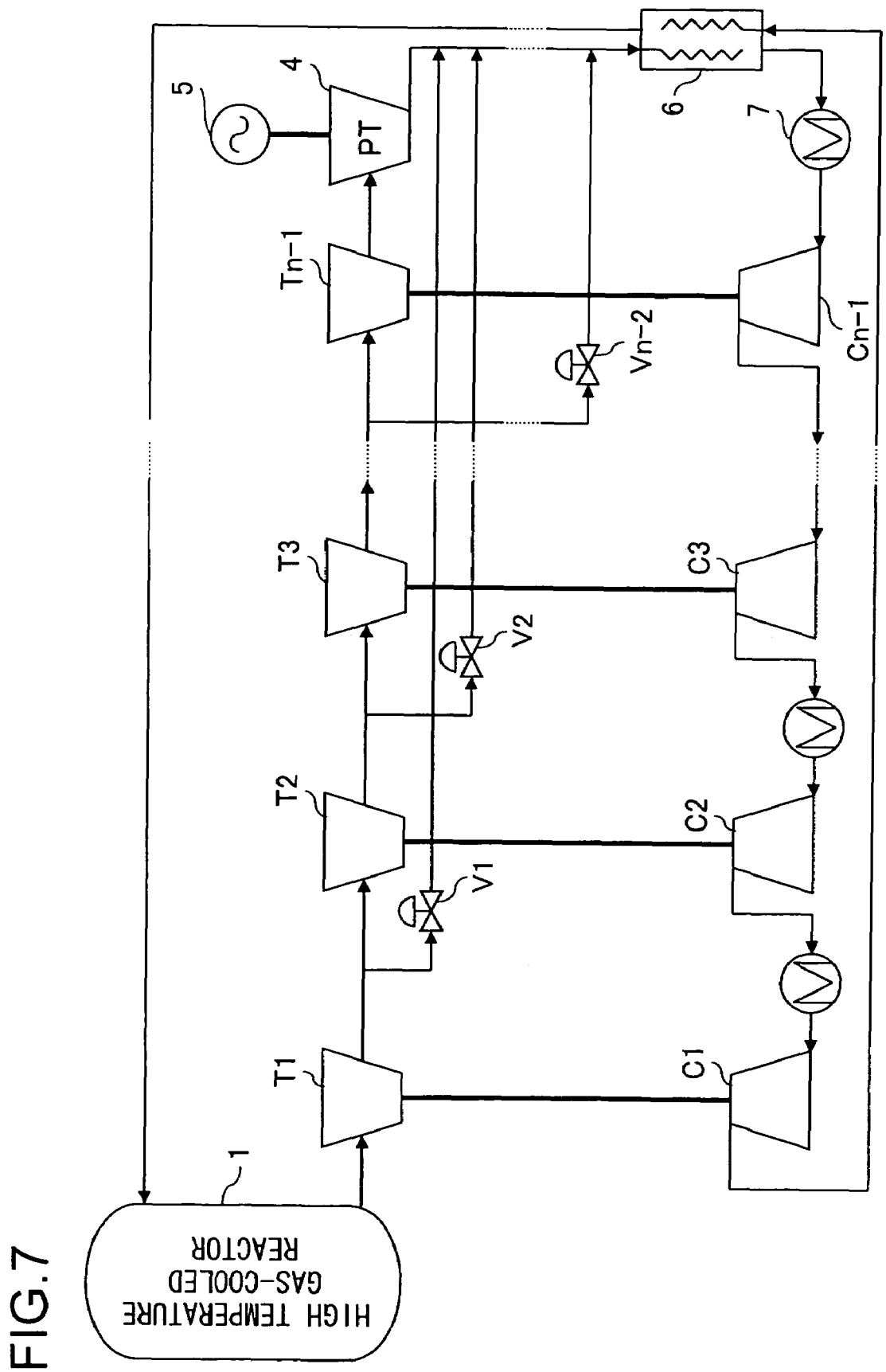
FIG. 7 is a block diagram showing another construction of a gas turbine plant in accordance with a second embodiment of the present invention.

Then, in the same manner as the first embodiment, when the PT 4 is not bypassed, as shown in FIG. 4, each of the "n–2"-shaft gas turbines sharing the same shafts with the compressors may have the bypass valves "V1" through "Vn–2" provided in a tandemly-arranged manner, and as shown in FIG. 5, may have the bypass valves "V1" through "Vn–2" installed in parallel in such an order as the bypass valve "V1" for bypassing the "n–2"-shaft gas turbines "T2" through "Tn–1," the bypass valve "V2" for bypassing the "n–3"-shaft gas turbines "T3" through "Tn–1," and so forth and the bypass valve "Vn–2" for bypassing a single shaft gas turbine "Tn–1." Moreover, in the same manner as the second embodiment, in order to have the helium gas bypass the PT 4, in a case where the bypass valves "V1" through "Vn–2" are installed in a tandemly-arranged manner, the bypass valve "Vn–2" is installed so as to bypass the PT 4, too, as shown in FIG. 6; and additionally, in a case where the bypass valves "V1" through "Vn–2" are installed in parallel, each of the bypass valves "V1" through "Vn–2" is installed so as to bypass the PT 4, too, respectively, as shown in FIG. 7.

Furthermore, when the bypass valves "V1" through "Vn–2" are provided as shown in FIG. 4 through FIG. 7, in case of FIG. 4 and FIG. 6, first, the bypass valves "V1" through "Vn–2" are opened so as to place the gas turbine "T1" at the rated rotating speed. Subsequently, the bypass valves "V1," "V2" and so forth and "Vn–2" are fully closed sequentially, thereby the gas turbines "T2," "T3" and so forth and "Tn–1" are revved up to the rated rotating speed sequentially. Also, in case of FIG. 5 and FIG. 7, first, the bypass valve "V1" is opened so as to place the gas turbine "T1" at the rated speed. Subsequently, after fully closing the bypass valve "V1," the bypass valves are opened in such an order as the bypass valves "V2" and so forth and "Vn–2" in order to attain the lift thereof, and then fully closed, thereby the gas turbines are revved up in such an order as the gas turbines "T2," "T3" and so forth and "Tn–1" in order to achieve the rated rotating speeds.

INDUSTRIAL APPLICABILITY

The gas turbine plant in accordance with the present invention is applicable to a gas turbine plant being provided with a high-temperature gas-cooled reactor and gas turbines being connected to a plurality of shafts, and is also applicable, whether coated-particle fuels to be used for the high-temperature gas-cooled reactor are either pebble bed fuels or block fuels.

What is claimed is:

1. A gas turbine plant comprising:
   a high-temperature gas-cooled reactor which warms a coolant by thermal energy being obtained by nuclear fission of clad fission products in coated-particle fuels;
   a number "n" of first gas turbines in series that are rotated by the coolant being warmed by the high-temperature gas-cooled reactor and share same shafts with compressors compressing the coolant;
   a second gas turbine that is rotated by the coolant being discharged from the last of the "n" first gas turbines serving as a last stage after rotating each of the "n" first gas turbines and shares a same shaft with a generator performing electrical power generation operation; and
   a number "n–1" of bypass flow passages with bypass valves that bypass each of corresponding "n–1" first gas turbines to a position downstream of the corresponding first gas turbine, excluding the first gas turbine in a first stage being closest to the high-temperature gas-cooled reactor, among the "n" first gas turbines;
   wherein, during start-up, by controlling a lift of the "n–1" bypass valves, each of the "n" first gas turbines has rotating speed thereof increased up to a rated rotating speed shaft by shaft sequentially, starting from the first gas turbine in a first stage.

2. A gas turbine plant as described in claim 1:
   wherein at least one of the "n–1" bypass flow passages with bypass valves bypasses the corresponding first gas turbine to a position downstream of the second gas turbine.

3. A gas turbine plant comprising:
   a high-temperature gas-cooled reactor which warms a coolant by thermal energy being obtained by nuclear fission of clad fission products in coated-particle fuels;
   a high pressure gas turbine which is rotated by the coolant being warmed by the high-temperature gas-cooled reactor and shares a same shaft with a high pressure compressor compressing the coolant;
   a low pressure gas turbine which is rotated by the coolant being discharged from the high pressure gas turbine and shares a same shaft with a low pressure compressor compressing the coolant;
   a gas turbine for electrical power generation which is rotated by the coolant being discharged from the low pressure gas turbine and shares a same shaft with a generator performing an electrical power generation; and a bypass flow passage with a bypass valve that bypasses the low pressure gas turbine to a position downstream of the low pressure gas turbine;

wherein, during start-up, first, a rotating speed of the high pressure compressor is increased up to a rated rotating speed by adjusting a lift of the bypass valve after charging the coolant with the bypass valve fully closed, and then next, with the bypass valve fully closed, a rotating speed of the low pressure compressor is increased up to a rated rotating speed.

4. A gas turbine plant as described in claim 3:

wherein the bypass flow passage with the bypass valve bypasses the low pressure gas turbine to a position downstream of the gas turbine for electrical power generation.

* * * * *